US007844262B2

(12) United States Patent
Diroo et al.

(10) Patent No.: US 7,844,262 B2
(45) Date of Patent: Nov. 30, 2010

(54) METHOD FOR ANNOUNCING A CALLING PARTY FROM A COMMUNICATION DEVICE

(75) Inventors: Yolius Diroo, San Antonio, TX (US); Edward Walter, Boerne, TX (US); Steve Wallmershauser, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 795 days.

(21) Appl. No.: 11/312,129

(22) Filed: Dec. 20, 2005

(65) Prior Publication Data

US 2007/0140219 A1 Jun. 21, 2007

(51) Int. Cl.
*H04M 3/00* (2006.01)
*H04M 3/42* (2006.01)
*H04M 11/00* (2006.01)
*H04W 72/00* (2009.01)

(52) U.S. Cl. .................. 455/418; 455/415; 455/445; 379/102.02

(58) Field of Classification Search ............... 455/415, 455/412.1, 412.2, 413, 418, 455; 379/142.06, 379/142.08, 72, 76, 82, 69, 88, 102.02
See application file for complete search history.

(56) References Cited

U.S. PATENT DOCUMENTS 6,714,637 B1 * 3/2004 Kredo .................. 379/215.01

| 6,950,504 | B1 * | 9/2005 | Marx et al. ............. 379/88.19 |
| 2002/0128033 | A1 * | 9/2002 | Burgess ................... 455/528 |
| 2003/0220099 | A1 * | 11/2003 | Hama ..................... 455/415 |
| 2005/0201534 | A1 * | 9/2005 | Ignatin .................. 379/88.22 |
| 2006/0148459 | A1 * | 7/2006 | Wolfman et al. ........... 455/415 |
| 2006/0264205 | A1 * | 11/2006 | Gibbs ..................... 455/413 |

FOREIGN PATENT DOCUMENTS

| EP | 1130891 | | 9/2001 |
| WO | WO 99/23843 | * | 5/1999 |
| WO | WO 9923843 | | 5/1999 |

* cited by examiner

*Primary Examiner*—Huy Phan
*Assistant Examiner*—Kathy Wang-Hurst
(74) *Attorney, Agent, or Firm*—Parks IP Law LLC; Jonathan A. Paulis

(57) ABSTRACT

A system and method are disclosed for announcing a calling party from a communication device. A system that incorporates teachings of the present disclosure may include, for example, a call processing system (102) can have a controller (108) for processing calls in a communication system (100). The controller can be programmed to detect (504) an incoming call initiated by a third party communication device over a first voice channel, transmit (508) to a communication device (115, 116) over a control channel a notification signal associated with the incoming call, detect (512) a connection made by the communication device to a second voice channel, transmit (518, 521) to the communication device over the second voice channel audio signals that identify a calling party, and link (524) the first and second voice channels upon detecting over the control channel a call acceptance action by the communication device. Additional embodiments are disclosed.

24 Claims, 6 Drawing Sheets

METHOD FOR ANNOUNCING A CALLING PARTY FROM A COMMUNICATION DEVICE

FIELD OF THE DISCLOSURE

The present disclosure relates generally to announcement techniques, and more specifically to a method for announcing a calling party from a communication device.

BACKGROUND

With caller ID and associated ring tones or music, an end user can identify a calling party by way of a text message conveyed on a display and/or sounds played out on a loud speaker of a communication device belonging to the end user. These announcement techniques, though helpful, can be improved.

DETAILED DESCRIPTION OF THE DRAWINGS

Figure 1:
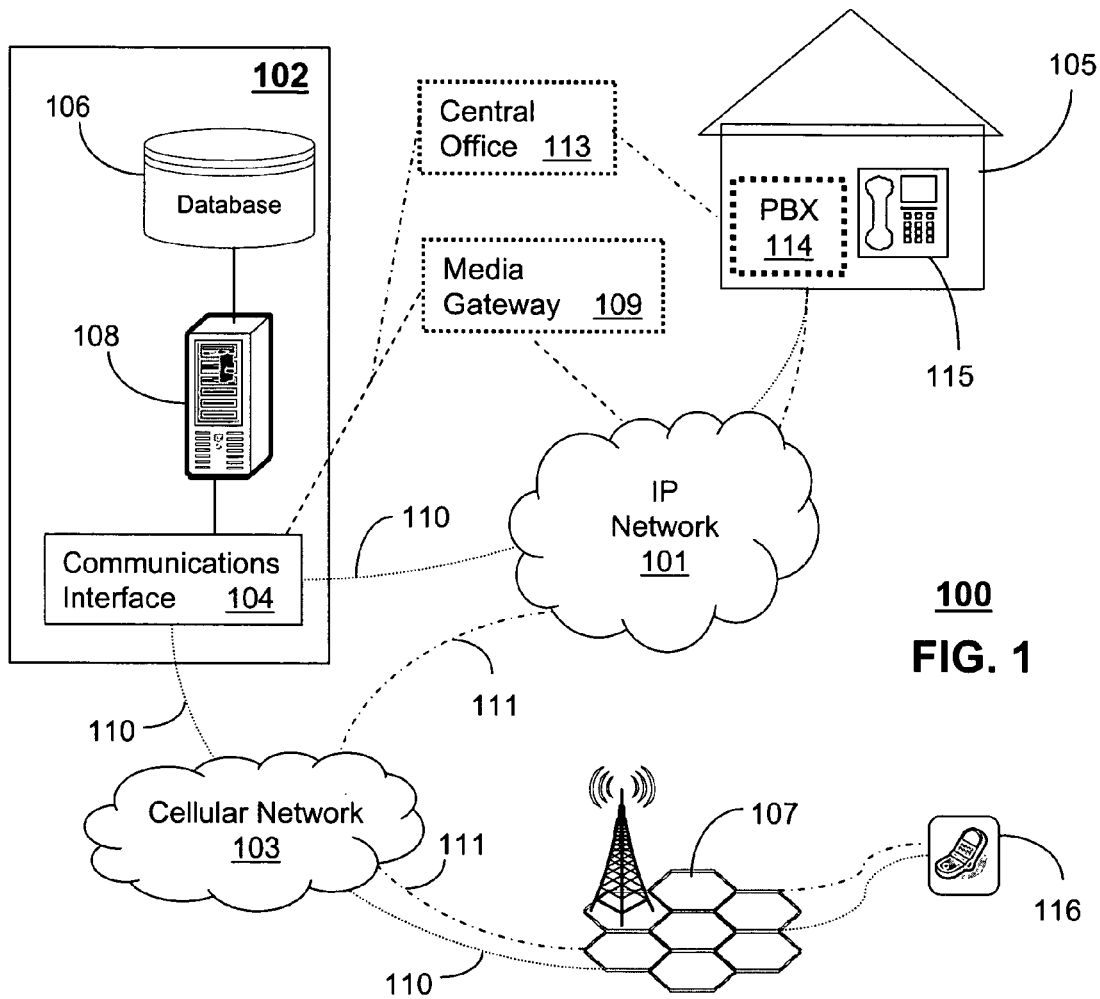
FIG. 1 is an exemplary block diagram of communication devices operating in a communication system managed in part by a call processing system (CPS)

Embodiments in accordance with the present disclosure provide a method for announcing a calling party from a communication device.

In a first embodiment of the present disclosure, a communication device can have a controller that manages operations of a transceiver for exchanging messages in a communication system, and a user interface (UI) for exchanging messages with an end user of the communication device. The controller can be programmed to receive from a call processing system (CPS) over a control channel a notification signal associated with a call initiated by a third party communication device, connect to a voice channel supplied by the communication system in response to detecting the notification signal, prevent transmission of speech signals of the end user over the voice channel, receive from the CPS audio signals transmitted over the voice channel that identify a calling party associated with the third party communication device, convey to the end user over a loud speaker of the UI audible signals corresponding to the audio signals received from the CPS, detect a manipulation of the UI by the end user corresponding to a call acceptance action, and transmit over the control channel an acceptance signal to the CPS requesting a direct connection to the third party communication device over the voice channel.

In a second embodiment of the present disclosure, a computer-readable storage medium operates in a communication device. The storage medium can have computer instructions for receiving an identification corresponding to an incoming call initiated by a third party communication device that is directed to the communication device, and determining according to the identification one among first and second responses. In the first response, the storage medium can have computer instructions for selecting according to the identification a prerecorded message including one among a first voice of a calling party associated with the third party communication device, and a second voice of the end user, presenting the end user speech signals corresponding to the prerecorded message, and connecting to a voice channel upon detecting a call acceptance action by the end user. In the second response, the storage medium can have computer instructions for connecting to the voice channel while preventing transmission of speech signals of the end user over the voice channel, transmitting to the third party communication device an indication that the calling party can begin to speak, receiving speech signals from the calling party of the third party communication device over the voice channel, presenting the end user audible signals corresponding to the speech signals of the calling party, and enabling transmission of speech signals of the end user over the voice channel upon detecting a call acceptance action by the end user.

In a third embodiment of the present disclosure, a call processing system (CPS) can have a controller that manages operations of a communications interface for processing calls in a communication system. The controller can be programmed to detect an incoming call initiated by a third party communication device that is directed to a communication device over a first voice channel, transmit to a communication device over a control channel a notification signal associated with the incoming call, detect a connection made by the communication device to a second voice channel supplied by the communication system, transmit to the communication device over the second voice channel audio signals that identify a calling party associated with the incoming call, and link the first and second voice channels upon detecting over the control channel a call acceptance action by the communication device.

In a fourth embodiment of the present disclosure, a method in a web portal application can be managed by a call processing system (CPS). The method can include the steps of presenting a graphical user interface (GUI) over the Internet for facilitating entry of provisioning information supplied by an end user of a communication device, storing an identification entered by the end user, wherein the identification comprises at least one among a calling party's name, a caller ID, and an access code corresponding to a third party communication device of a calling party, storing a calling number entered by the end user corresponding to the communication device, wherein the calling number of the communication device is associated with the identification of the third party communication device, storing a selection for an audio signal type entered by the end user corresponding to one among a group of audio signal types comprising a live announcement, and a prerecorded announcement, wherein the selection is associated with the identification, storing an audio signal source supplied by the end user for the audio signal type corresponding to the prerecorded announcement, wherein the audio signal source is one among a group of audio signal sources comprising a ring tone, music, and a prerecorded message in the calling party's voice or in the end user's voice, each of which can identify the calling party, storing a presentation limit entered by the end user corresponding to the selected audio signal type, and transmitting to the CPS the foregoing provisioning information supplied by the end user.

FIG. 1 is an exemplary block diagram of communication devices 115, 116 operating in a communication system 100 managed in part by a call processing system (CPS) 102. The communication system 100 comprises an IP (Internet Protocol) network 101 coupled to the CPS 102, a cellular network 103 and a building 105 consisting of an enterprise or residence. The IP network 101 utilizes technology for transporting Internet traffic. For an enterprise setting, the building 105 can include a PBX 114 that provides connectivity services between terminal devices 115 of enterprise personnel such as a Voice over IP or VoIP phone, or POTS (Plain Old Telephone Service) phone. In a residential setting, the building 105 can include a VoIP or POTS phone coupled to a central office 113 utilizing conventional telephonic switches for processing calls with third parties. The CPS 102 can be used to control operations of a media gateway 109, the central office 113 and the PBX 114.

The CPS 102 can comprise a communications interface 104 that utilizes common technology for communicating over an IP interface with the IP network 101, the media gateway 109, or the cellular network 103. The CPS 102 further comprises a memory 106 (such as a high capacity storage medium) embodied in this illustration as a database, and a controller 108 that makes use of computing technology such as a desktop computer, or scalable server for controlling operations of the CPS 102. The CPS 102 can operate as an IP Multimedia Subsystem (IMS) conforming in part to protocols defined by standards bodies such as 3GPP (Third Generation Partnership Protocol), and the claims described below.

Under the control of the CPS 102, the media gateway 109 can link packet-switched and circuit-switched technologies such as the cellular network 103 and the IP network 101, respectively. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication between the media gateway 109, which converts data from the format required for a circuit-switched network to that required for a packet-switched network. MGCP can therefore be used to set up, maintain, and terminate calls between multiple disparate network elements of the communication system 100.

The cellular network 103 utilizes circuit-switched technology supporting voice and data services such as GSM-GPRS, EDGE, CDMA-1X, UMTS, and other known technologies. The cellular network 103 is coupled to base stations 107 under a frequency-reuse environment for communicating over-the-air with roaming communication devices 116.

Figure 2:
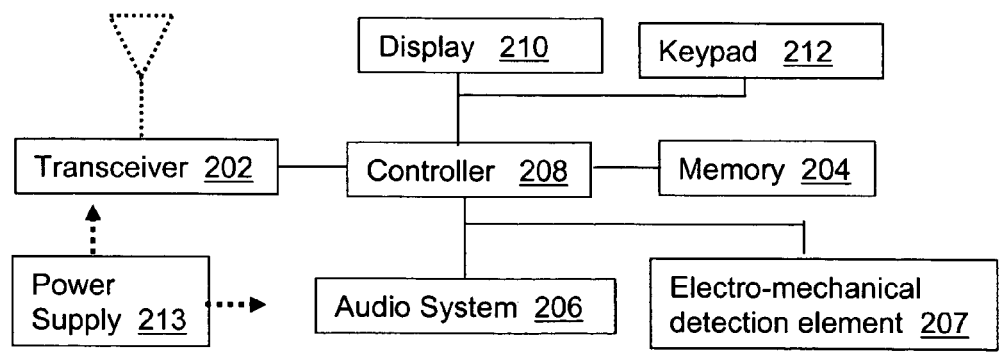
FIG. 2 is an exemplary block diagram of alternate embodiments of the communication devices.

FIG. 2 is an exemplary block diagram of alternate embodiments of the communication devices 115, 116. In a first embodiment, the communication device 115 can be embodied in an immobile device (e.g., a wireline phone). In a supplemental embodiment, the communication device 115 can also include short range communications technology (e.g., a cordless phone) to support mobility within a small area such as the end user's residence. Alternatively, the communication device 116 can represent a mobile device utilizing a wireless transceiver 202 supporting long-range wireless communications. The wireless transceiver 202 of communication device 116 utilizes technology for exchanging voice and data messages with the base stations 107, which in turn relays said messages to targeted end users. For communication device 115, the wireline and/or wireless transceiver 202 can utilize communications technology such as POTS, WiFi, Bluetooth™, or cordless.

Alternatively, the communication devices 115, 116 can be integrated as a multimode communication device (MCD). That is, when the MCD is within the premises of the building 105 it can be designed to function as a POTS wireline device or a VoIP device over WiFi, Bluetooth™, or cordless much like reference 115. When roaming outside the building 105, the MCD functions as a wireless communication device operating on the cellular network 103 like reference 116.

Each of the foregoing embodiments for communication devices 115, 116 can further utilize a memory 204, an audio system 206, an electromechanical detection element 207, and a controller 208. The memory 204 comprises storage devices such as RAM, SRAM, DRAM, and/or Flash memories. The memory 204 can be an integral part of the controller 208. The audio system 206 can comprise a low volume speaker for listening to messages near the end user's ear and an associated microphone for exchanging messages with calling parties. The audio system 206 can further utilize a loud speaker for listening to announcements at a distance substantially away from the end user's ear, and as a speakerphone feature.

The electro-mechanical detection element 207 utilizes common technology for detecting when the end user accepts a call. For example, in a first embodiment communication device 116 can be housed in a flip-assembly. The electro-mechanical detection element 207 can be used to detect when the end user opens the flip assembly thereby signaling the controller 208 that the end user has performed a call acceptance action (i.e., the end user is prepared to engage in a conversation with the calling party). Alternatively, the electromechanical detection element 207 can be housed in an immobile communication device 115 whereby the detection mechanism can represent an on and off-hook detection mechanism much like what is used today in POTS phones.

The controller 208 can manage the foregoing components with computing technology such as a microprocessor and/or digital signal processor. The communication devices 115, 116 can further include a display 210 for conveying images to the end user, a keypad 212 for manipulating operations of the communication device, and a portable power supply 213. The audio system 206, electromechanical detection element 207, display 210, and the keypad 212 can singly or in combination represent a user interface (UI) for interfacing with the end user.

It would be apparent to one of ordinary skill in the art that the communication technologies illustrated in FIG. 1 can be modified without departing from the scope and spirit of the claims described below. For instance, the cellular network 103 can be replaced with a WiFi or WiMax network without departing from the teachings of the present disclosure and the claims described herein.

Figure 3:
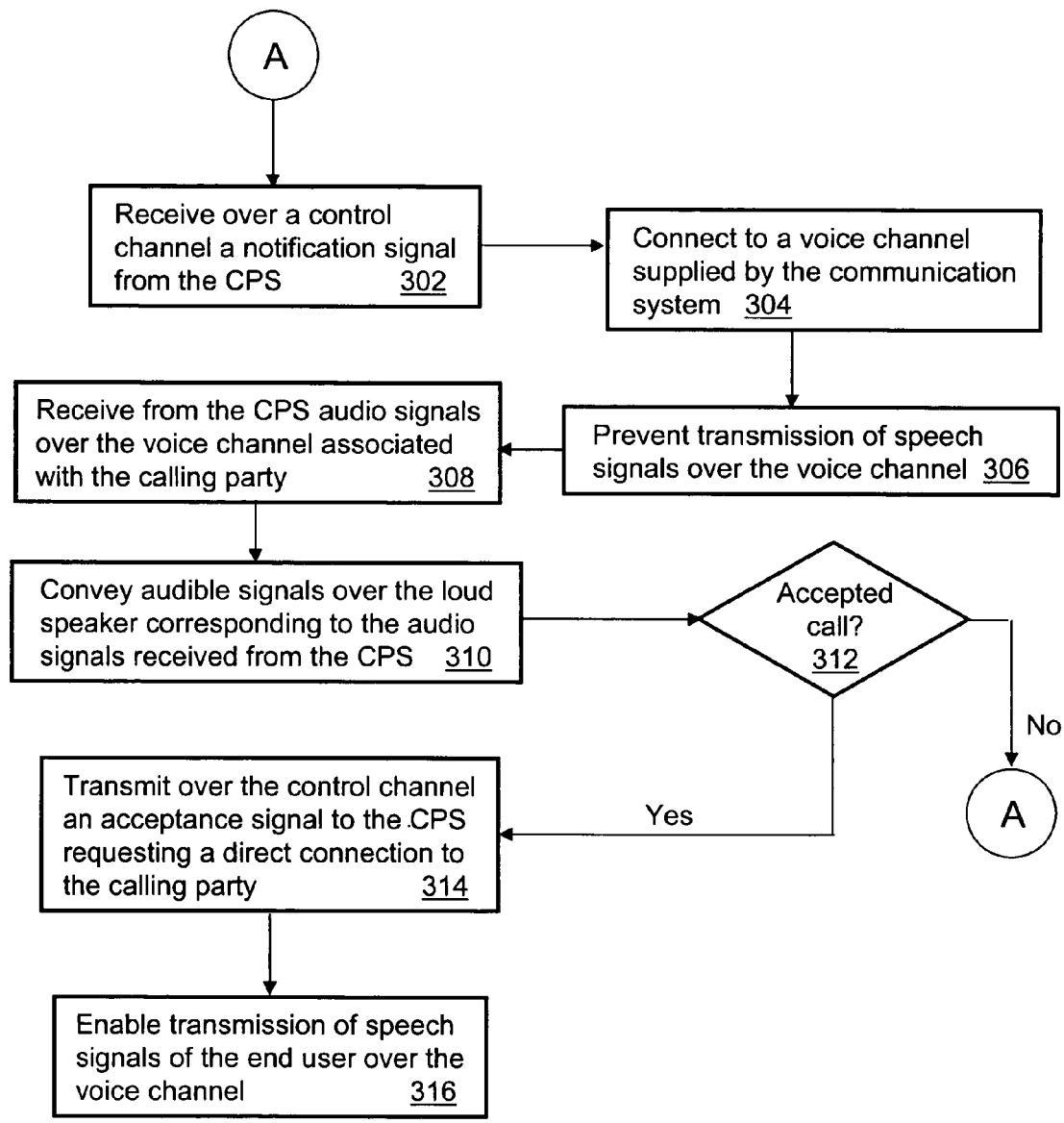
FIGS. 3-4 depict exemplary flowcharts of alternate methods operating in the communication devices.
Figure 4:
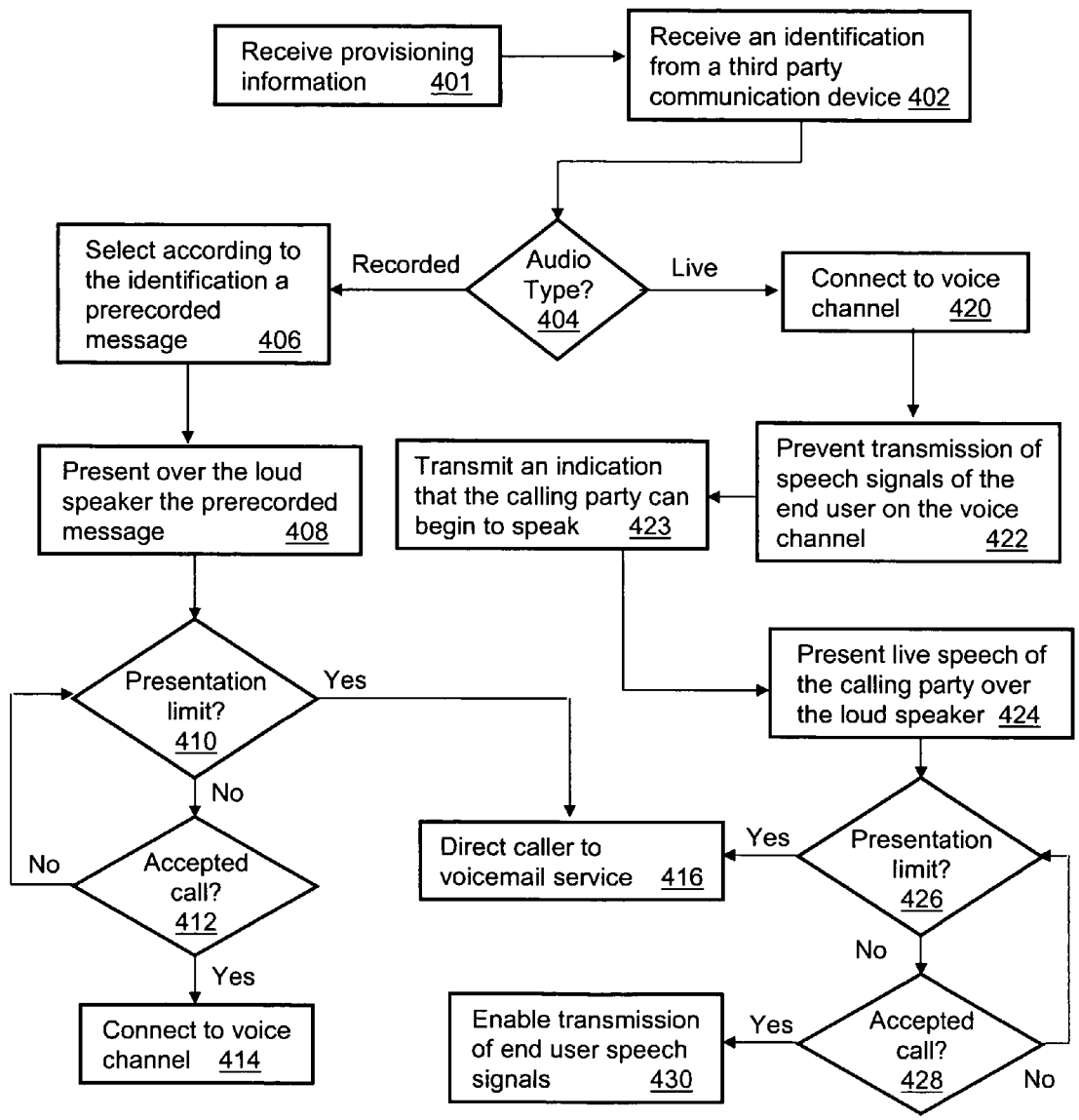

With this in mind, FIGS. 3-4 are presented as exemplary flowcharts of alternate methods 300, 400 operating in the communication devices 115, 116. In a first embodiment, method 300 begins with step 302 in which the controller 208 of the communication device receives over a control channel a notification signal from the CPS 102. The notification signal is associated with a call initiated by a third party communication device operated by a calling party. The third party communication device can be similar or the same as communication devices 115, or 116, or any other conventional device for communication purposes.

In a POTS environment, the notification signal can be transmitted over a control channel such as a copper wire routed from central office 113 to building 105 commonly used today for ringing POTS phones. A unique signal can be transmitted over the copper interface instead of the conventional POTS voltage to provide the controller 208 a means to identify the notification signal as originating from the CPS 102. In an IP environment, the notification signal can be transmitted over a control channel of the IP network 101 conforming to a session initiation protocol (SIP) commonly used in VoIP applications.

In step 304, the controller 208 can be programmed to connect to a voice channel supplied by the communication system 100. The voice channel can be a circuit-switched or packet-switched voice channel. The controller 208 can be further programmed in step 306 to cause the audio system 206 to mute the microphone so as to prevent the calling party from hearing the end user prior to accepting the call.

In step 308, the controller 208 can be programmed to receive from the CPS 102 audio signals over the voice channel associated with the calling party. The audio signals can be any one of a number of audio sources such as a ring tone or music associated specifically with the calling party, a prerecorded message in the calling party's voice or the end user's voice, or live speech of the calling party, each of which can identify the calling party. The ring tone can be of any kind and any quality (MIDI, MP3 and so on). The music can be of a popular artist supplied as fidelity digital music conforming to an MP3 format.

The prerecorded message can be any recording of the calling party or the end user for identification purposes. For exampling, the end user can record a message in the end user's voice stating, "Mom's calling." For a personalized touch, a similar prerecorded message can be created in the calling party's voice such as, for example, "It's Mom. Johnny, please answer."

The controller 208 can convey audible signals over the loud speaker corresponding to the foregoing audio signals received from the CPS in step 308. Accordingly, the aforementioned steps replace the conventional ring tone commonly heard in cell phones, POTS phones, and VoIP phones. Instead the end user hears a personalized announcement that uniquely identifies the calling party.

In step 312, the controller 208 can be programmed to detect by way of the electro-mechanical element 207 a call acceptance action by the end user. If the end user decides not to answer the call, the announcement conveyed in step 310 will eventually cease when the calling party chooses to end the call, or when the calling party is directed to a voicemail service by the CPS 102. When this happens, the controller 208 proceeds to step 302 to process other incoming calls.

If, on the other hand, the end user accepts the call by manipulating a function of the communication device's UI (e.g., lifts the handset of the communication device from its base unit, opens a flip phone, depresses a button on the keypad 212, etc.) thereby triggering the electromechanical detection element 207, the controller 208 proceeds to step 314 where it transmits over the control channel an acceptance signal to the CPS 102 requesting a direct connection to the calling party. The control signal can be a unique voltage signal, or the same off-hook signal used by POTS phones today. In an IP environment, the acceptance signal can be a message on the SIP channel for identifying an off-hook event.

From step 314, the controller 208 proceeds to step 316 where it enables the microphone of the audio system 206 for exchanging speech signals with the calling party. If a speaker phone feature is also enabled, communications take place over the loud speaker; otherwise, the end user places the communication device 115, 116 near or upon her ear to listen to messages by way of the low volume speaker of the audio system 206.

Method 400 provides an alternative embodiment in which the communication devices 115, 116 operate independently from the CPS 102. In this embodiment, the controller 208 can begin with step 401 where it receives provisioning information corresponding to a process for generating an announcement associated with the calling party similar to the process described in method 300. The provisioning information can be supplied by a computing device such as a desktop computer, a web portal application, or the communication system 100 by transmitting over-the-air (e.g., short message system or SMS) messages that include portions of the provisioning information.

In step 402, the controller 208 can receive an identification (or ID) from a third party communication device over a first voice channel. The identification can be one among a caller ID or an access code. The caller ID can represent an ANI (Automatic Number Identification) for identifying the third party communication device. If the calling party is unable to use her own communication device and must utilize, for example, a public phone, the controller 208 can be programmed to identify the calling party by way of an access code entered by the calling party. The access code can be a sequence of DTMF (Dual Tone Multi Frequency) tones generated by keystrokes entered by the calling party on the public phone.

Upon detecting an ID associated with the calling party, the controller 208 can proceed to step 404 where it selects a process for presenting a recorded message or live speech from the calling party according to the identification. For recorded messages, the controller 208 proceeds to step 406 where it selects a prerecorded message according to the ID. The prerecorded message can be any of the embodiments described above for method 300. In step 408, the controller 208 can be programmed to present over the loud speaker the prerecorded message. Since the controller 208 has not connected to a voice channel associated with calling party, it does not matter whether the microphone portion of the audio system 206 is enabled or disabled.

The presentation step can be repeated a number of times not to exceed a presentation limit (e.g., 4 cycles) as monitored by the controller 208 in step 410. If the controller 208 does not detect a call acceptance action by the end user in step 412, and the presentation limit has been exceeded, the controller 208 proceeds to step 416 where it directs the calling party to a voicemail service. The voicemail service can reside in the communication system 100 or in the communication device itself. If, on the other hand, the end user accepts the call, the controller 208 proceeds to step 414 where it connects to the voice channel of the incoming call.

If the controller 208 identifies in step 404 a process for live speech, the controller 208 proceeds to step 420 where it connects to the voice channel associated with the incoming call. In step 422, the controller 208 can be programmed to cause the audio system 206 to prevent transmission of speech signals of the end user over the voice channel. Once the microphone is muted, the controller 208 can transmit in step 423 an indication to the calling party that s/he can begin to speak. The indication can be a synthesized instruction stating, for example, "You may now make an announcement." Alternatively, the indication can be a "beep" or "chirp" that is familiar to the calling party for beginning the announcement response.

In step 424, the controller 208 presents the live speech of the calling party over the loud speaker. The calling party can be given a set presentation limit similar to step 410. In this embodiment, the presentation limit can represent a specific time limit (e.g., 10 seconds) monitored by the controller 208 in step 426. If the end user does not accept the call in step 428 and the presentation limit is exceeded, the controller 208 proceeds to step 416; otherwise, the controller 208 proceeds to step 430 where it causes the audio system 206 to enable the microphone so that the end user can engage in conversation with the calling party.

Figure 5:
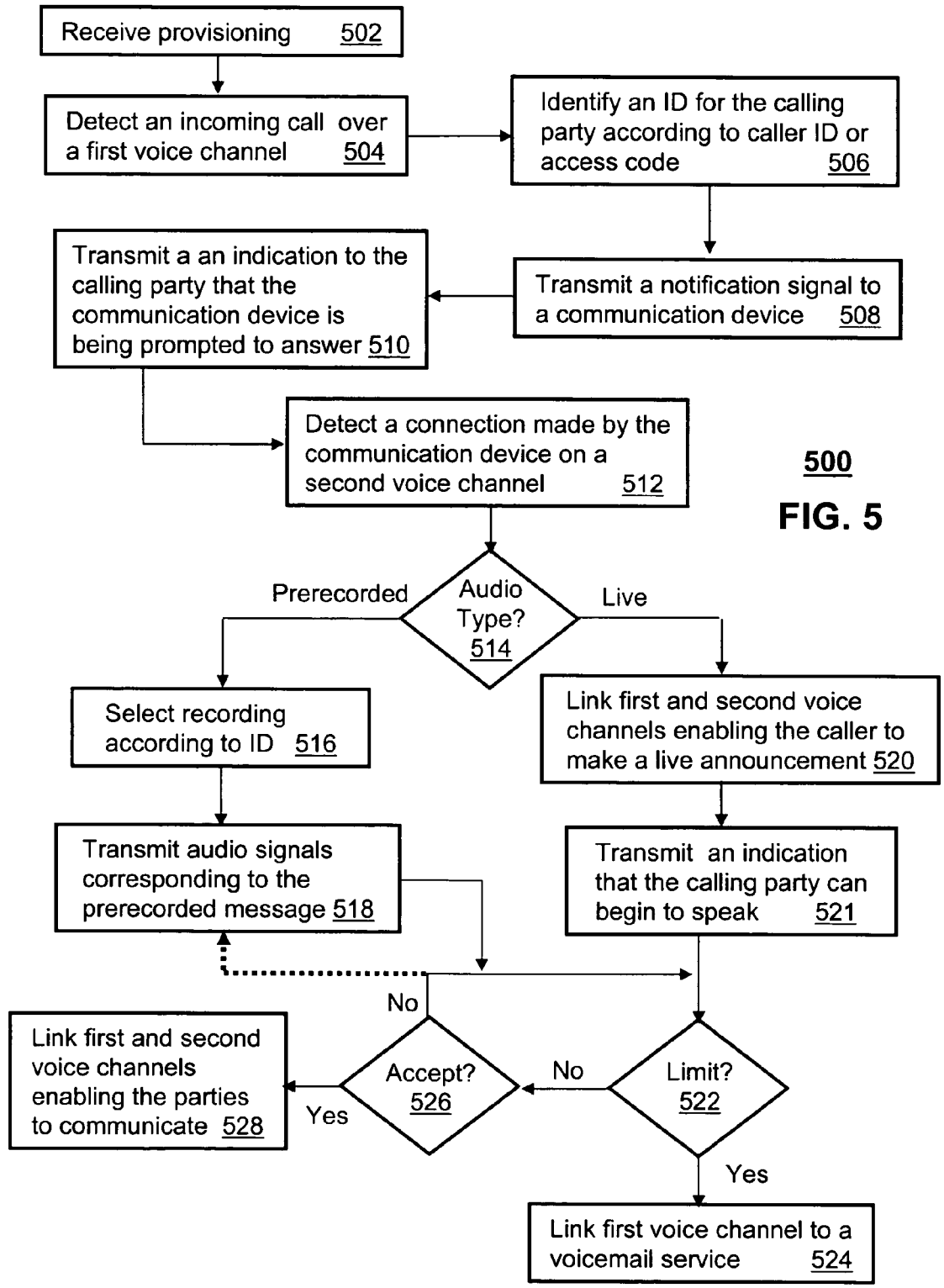
FIG. 5 depicts an exemplary flowchart of a method operating in the CPS.

FIG. 5 depicts an exemplary flowchart of a method 500 operating in the CPS 102 which mirror images in part the functions described in method 300. Method 500 begins with step 502 where the CPS 102 is provisioned by the end user. This step can take place according to the steps of method 600 illustrated by a flowchart in FIG. 6 which will be discussed shortly. In step 504, the controller 108 of the CPS 102 can be programmed to detect an incoming call over a first voice channel. The detection can occur from signaling information (e.g., SS7 or SIP) transmitted by any of the network elements in the communication system 100 of FIG. 1. The signaling information can correspond to a packet-switched network or circuit-switched network. In step 506, the controller 108 can be further programmed to identify an ID for the calling party according to the ANI, or an access code supplied by the calling party as described earlier.

In step 508, the controller 108 can be programmed to transmit a notification signal to the targeted communication device. The notification signal can be a POTS signal or IP signal generated by the network elements of FIG. 1 under the control of the CPS 102. In step 510, the controller 108 can also be programmed to transmit an indication to the calling party that the communication device is being prompted to answer. The indication can be similar or the same as the ringing sound heard today by common phones when a calling party is making a call to a targeted recipient. In step 512, the controller 108 can be programmed to detect a connection made by the communication device over a second voice channel supplied by the communication system 100.

Once connected to the second voice channel, the controller 108 can be programmed to select an audio signal type according to the ID received in step 506. Similar to the descriptions of method 400, the selection can consist of a process for presenting a prerecorded message or live speech from the calling party. In the former, the controller 108 proceeds to step 516 where it selects a prerecorded message according to the ID. The prerecorded message can be any of the embodiments described earlier. In step 518, the controller 108 repeatedly transmits to the communication device over the second voice channel audio signals corresponding to the prerecorded message.

In step 522, the controller 108 monitors whether the audio signals transmitted have exceeded a presentation limit (e.g., 4 cycles). If the controller 108 does not detect an acceptance signal from the communication device in step 526, and the presentation limit has been exceeded (e.g., 4 cycles of the prerecorded message have been presented), the controller 108 proceeds to step 524 where it links the first voice channel associated with the calling party to a voicemail service associated with the end user of the targeted communication device. Otherwise if the end user has accepted the call, the controller 108 proceeds to step 528 where it links the first and second voice channels, thereby enabling the parties to communicate.

If a process for live speech is selected in step 514, the controller 108 proceeds to step 520 where it links the first and second voice channels temporarily to allow the calling party to announce him or herself. Similar to step 413 of FIG. 4, the controller 108 submits an indication to the calling party that s/he can begin to speak. If the controller 208 does not detect an acceptance signal from the communication device in step 526 and the presentation limit for live speech has been exceed in step 522, then the controller 108 proceeds to step 522 where it disconnects the first voice channel from the second voice channel, and links the first voice channel to the voicemail service in step 524. Otherwise, the controller 108 permanently links the first and second voice channels until such time as either party ends the call.

Figures 6, 7:
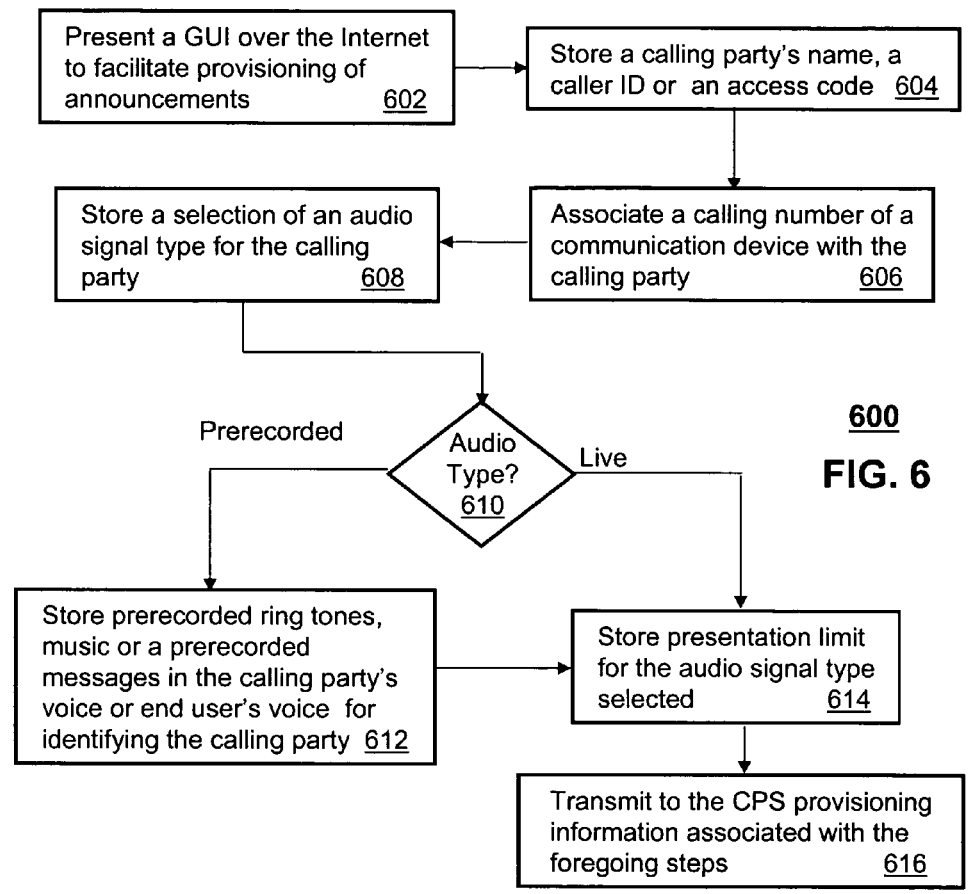
FIG. 6 depicts an exemplary flowchart of a method operating in a web portal application hosted by the CPS.
FIG. 7 depicts an exemplary graphical user interface (GUI) of the web portal application for entering provisioning information for the CPS.

FIG. 6 depicts an exemplary flowchart of method 600 operating as a web portal application hosted by the CPS 102. The web portal application can operate as computer instructions in the controller 108 of the CPS 102, or in a separate computing device managed by the CPS 102. For illustration purposes only, the web portal application will be assumed to operate as an independent computing device. It should also be noted that method 600 describes one of many possible means for provisioning the CPS 102. Accordingly, method 600 begins with step 602 where the web portal application presents a graphical user interface (GUI) over the Internet to facilitate provisioning announcements as described earlier for methods 300 and 500. The GUI can be viewed by a conventional web browser (see FIG. 7 for an illustration).

In step 604, the web portal application can store a calling party's name, a caller ID, or an access code as illustrated in FIG. 7. The web portal application can be further programmed in step 606 to associate a calling number of the communication device (e.g., 555-555-666) with the calling party (e.g., John Doe). This step therefore allows an end user to configure announcements for each of a number of communication devices carried by the end user (e.g., a cell phone, a VoIP phone) for business or personal use. In step 608, the web portal application can be programmed to store a selection of an audio signal type for the calling party. As noted by the foregoing methods, the audio signal type can be a recorded message or live speech of the calling party. In the former use case, the web portal application can proceed to step 612 where it stores any number of recorded audio sources supplied by the end user. The audio sources can include, for example, specific ring tones, music, prerecorded messages in the calling party's voice, or the end user's voice. Simply put, the end user can supply any audible source which can assist the him or her in identifying the calling party.

The web portal application then proceeds to step 614 where it stores a presentation limit for each calling party identified. The presentation limit can be a temporal limit or cycle limit as described earlier. Once the provisioning information has been entered, the web portal application can proceed to step 616 where it transmits to the CPS 102 the provisioning information associated with the calling parties. FIG. 7 depicts an illustration with pull-down menus and two calling party entries fully populated. Other GUI formats can be used with more fields as needed.

Figure 8:
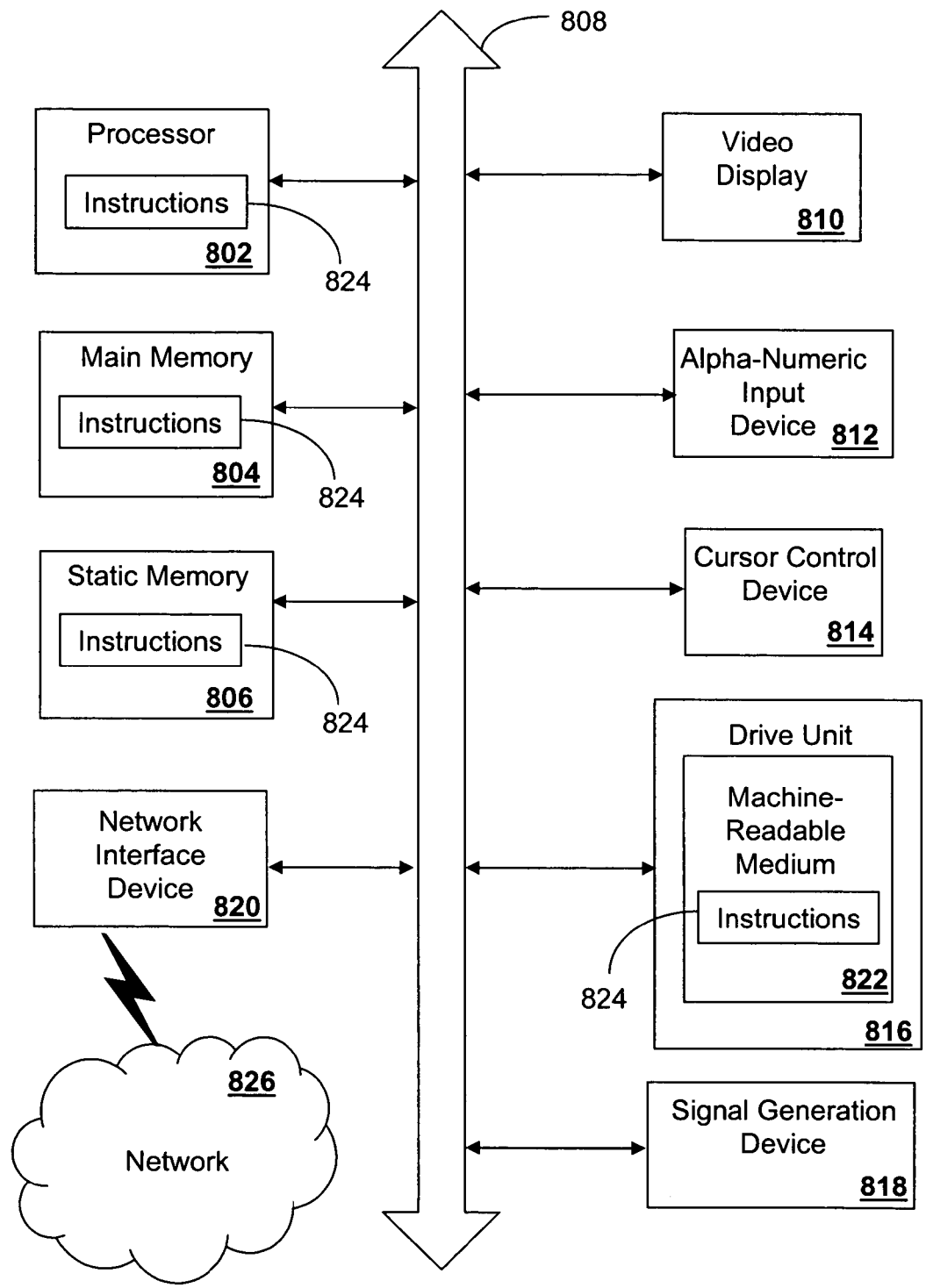
FIG. 8 is a diagrammatic representation of a machine in the form of a computer system within which a set of instructions, when executed, may cause the machine to perform any one or more of the methodologies discussed herein.

FIG. 8 is a diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
a controller that manages operations of a transceiver for exchanging messages in a communication system, and a user interface (UI) for exchanging messages with an end user of the communication device, wherein the controller is programmed to:
receive from a call processing system (CPS) over a control channel a notification signal associated with a call initiated by a third party communication device;
connect to a voice channel supplied by the communication system in response to detecting the notification signal;
prevent transmission of speech signals of the end user over the voice channel to avoid a calling party associated with the third party communication device from hearing audio signals in a vicinity of the communication device;
receive from the CPS audio signals transmitted over the voice channel by the third party communication device that identify the calling party associated with the third party communication device;
convey to the end user over a loud speaker of the UI audible signals corresponding to the audio signals received from the CPS;
detect a manipulation of the UI by the end user corresponding to a call acceptance action; and
transmit over the control channel an acceptance signal to the CPS requesting a direct connection to the third party communication device over the voice channel,
wherein the audio signals conveyed by the CPS comprise live, audible speech of the calling party to identify the calling party prior to detecting the call acceptance action, and prior to directing the calling party to a voicemail service.

2. The communication device of claim 1, wherein the controller is programmed to enable transmission of speech signals of the end user over the voice channel upon submitting the acceptance signal.

3. The communication device of claim 1, wherein the voice channel comprises one among a circuit-switched channel and a packet-switched channel, and wherein the transceiver comprises at least one among a wireless transceiver and a wireline transceiver.

4. The communication device of claim 1, wherein the packet-switched channel conforms to a Voice over IP (VoIP) protocol.

5. The communication device of claim 1, comprising a transceiver, wherein the UI comprises an electro-mechanical detection element in a portion of a housing assembly of the communication device for signaling the controller that the end user has performed the call acceptance action, and an audio system having a low volume speaker for listening to messages near the end user's ear, and the loud speaker for listening to announcements substantially away from the end user's ear, wherein the controller is programmed to convey the audio signals supplied by the CPS on the loud speaker.

6. The communication device of claim 1, wherein the controller is programmed to:
receive the notification signal according to a session initiation protocol; and
submit the acceptance signal according to the session initiation protocol.

7. The communication device of claim 1, wherein the controller is programmed to process voice messages exchanged with the third party communication device over the voice channel according to a real-time transport protocol.

8. A tangible, non-transitory computer-readable storage medium of a communication device, the storage medium comprising computer-executable instructions that, when executed, cause the communication device to perform the steps comprising:
receiving an identification corresponding to an incoming call initiated by a third party communication device that is directed to the communication device;
determining according to the identification one among first and second responses;
in the first response,
selecting according to the identification a prerecorded message including one among a first voice of a calling party associated with the third party communication device, and a second voice of the end user;
presenting the end user speech signals corresponding to the prerecorded message; and
connecting to a voice channel upon detecting a call acceptance action by the end user;
in the second response,
connecting to the voice channel while preventing transmission of speech signals of the end user over the voice channel;
transmitting to the third party communication device an indication that the calling party can begin to speak;
receiving speech signals from the calling party of the third party communication device over the voice channel;
presenting the end user audible signals corresponding to the speech signals of the calling party; and
enabling transmission of speech signals of the end user over the voice channel upon detecting a call acceptance action by the end user, wherein the audible signals comprise live, audible speech of the calling party to identify the calling party prior to detecting the call acceptance action, and prior to directing the calling party to a voicemail service.

9. The storage medium of claim 8, further comprising computer instructions that, when executed, cause the communication device to perform the steps comprising:
repeatedly presenting over a loud speaker end user speech signals corresponding to the prerecorded message according to a presentation limit; and
directing the third party communication device to the voicemail service upon exceeding the presentation limit.

10. The storage medium of claim 8, further comprising computer instructions that, when executed, cause the communication device to perform the steps comprising:
presenting over a loud speaker speech signals of the calling party according to a presentation limit; and
directing the third party communication device to the voicemail service upon exceeding the presentation limit.

11. The storage medium of claim 8, further comprising computer instructions that when executed, cause the communication device to perform the steps comprising:
receiving the prerecorded message from at least one among speech of the end user presented by way of the UI, a portal, and a computing device; and
storing the prerecorded message for use in identifying the calling party upon receiving the incoming call.

12. The storage medium of claim 8, wherein the identification comprises one among a caller ID associated with the incoming call, and an access code supplied by the calling party over the first voice channel, and wherein the controller is programmed to:
receive provisioning information corresponding to a process for generating an announcement associated with the calling party, wherein the provisioning information is supplied by a computing device comprising one among a computer, a web portal application, and a communication system that transmits over-the-air messages including portions of the provisioning information; and
prevent transmission of speech signals of the end user over the voice channel until detecting the call acceptance action by the end user.

13. A call processing system (CPS), comprising:
a controller that manages operations of a communications interface for processing calls in a communication system, wherein the controller is programmed to:
detect an incoming call initiated by a third party communication device that is directed to a communication device over a first voice channel;
transmit to a communication device over a control channel a notification signal associated with the incoming call;
detect a connection made by the communication device to a second voice channel supplied by the communication system;
transmit to the communication device over the second voice channel audio signals generated by the third party communication device that identify a calling party associated with the incoming call, while preventing audio signals generated by the communication device to be received by the third party communication device;
link the first and second voice channels upon detecting over the control channel a call acceptance action by the communication device;
identify the calling party according to an access code supplied over the first voice channel;
select according to the access code an audio signal comprising live, audible speech from the calling party; and
transmit the select audio signal over the second voice channel.

14. The CPS of claim 13, wherein the controller is programmed to:
identify the calling party according to a caller ID associated with the incoming call.

15. The CPS of claim 13, wherein the controller is programmed to:
transmit to the communication device over the second voice channel the audio signals according to a presentation limit;
link the first voice channel to a voicemail service upon exceeding the presentation limit.

16. The CPS of claim 13, wherein the controller is programmed to:
while waiting to detect the connection by the communication device to the second voice channel, transmit to the third party communication device over the first voice channel a first indication that the communication device is being prompted to answer the incoming call;
upon detecting the connection by the communication device to the second voice channel, transmit to the third party communication device over the first voice channel a second indication that the calling party can begin to speak; and
transmit to the communication device over the second voice channel speech signals of the calling party received from the first voice channel.

17. The CPS of claim 13, wherein the controller is programmed to receive from an Internet application provisioning information corresponding to the audio signals, and wherein the provisioning information comprises an identification of the calling party.

18. The CPS of claim 13, comprising a media gateway for linking the first and second voice channels, wherein the CPS comprises an IP Multimedia Subsystem (IMS) that manages operations of the media gateway, and wherein the controller is programmed to:
create the notification signal according to a session initiation protocol;
process the acceptance signal according to the session initiation protocol;
and
process speech signals between the end user of the communication device and the calling party using a third party communication device according to a Voice over IP (VoIP) protocol.

19. A method in a web portal application, comprising:
presenting a graphical user interface (GUI) over the Internet for facilitating entry of provisioning information supplied by an end user of a communication device;
storing an identification entered by the end user, wherein the identification comprises at least one among a calling party's name, a caller ID, and an access code corresponding to a third party communication device of a calling party;
storing a calling number entered by the end user corresponding to the communication device, wherein the calling number of the communication device is associated with the identification of the third party communication device;
storing a selection for an audio signal type entered by the end user corresponding to a live, audible speed presentable by the calling party, wherein the selection is associated with the identification;
storing a presentation limit entered by the end user corresponding to the selected audio signal type; and
transmitting to a call processing system (CPS) the foregoing provisioning information supplied by the end user, wherein the provisioning information is used by the CPS to manage a live announcement in the form of live, audible speech presentable by the calling party responsive to the CPS detecting a call initiated by the call party by way of the third party communication device and directed to the communication device, while preventing audio signals generated by the communication device to be received by the third party communication device.

20. The method of claim 19, wherein the web portal application is managed by the CPS.

21. A tangible, non-transitory computer-readable storage medium operating in a call processing system (CPS), the storage medium comprising computer-executable instructions that, when executed, cause the communication device to perform the steps comprising:
directing a communication system to present at a communication device live, audible speech from a calling party prior to detecting a call acceptance action by the end user of the communication device, and prior to directing the calling party to a voicemail service; and directing the calling party to the voicemail service when the end user of the communication device does not accept a call from the calling party and a presentation limit of the live speech is exceeded.

22. A tangible, non-transitory computer-readable storage medium operating in a communication device, the storage medium comprising computer-executable instructions that, when executed, cause the communication device to perform the steps comprising:

presenting live, audible speech from a calling party prior to detecting a call acceptance action by the end user of the communication device, and prior to directing the calling party to a voicemail service; and directing the calling party to the voicemail service when the end user of the communication device does not accept a call from the calling party and a presentation limit of the live speech is exceeded.

23. The communication device of claim 1, wherein the calling party is directed to the voicemail service when the end user of the communication device does not accept a call from the calling party and a presentation limit is exceeded.

24. The storage medium of claim 8, wherein the calling party is directed to the voicemail service when the end user of the communication device does not accept the incoming call from the calling party and a presentation limit is exceeded.

* * * * *